United States Patent
Takada et al.

(10) Patent No.: US 9,595,715 B2
(45) Date of Patent: Mar. 14, 2017

(54) NEGATIVE ELECTRODE ACTIVE MATERIAL AND USE OF SAME

(71) Applicants: National University Corporation Okayama University, Okayama (JP); Tokyo Institute of Technology, Tokyo (JP); Kyoto University, Kyoto (JP)

(72) Inventors: Jun Takada, Okayama (JP); Hideki Hashimoto, Okayama (JP); Tatsuo Fujii, Okayama (JP); Makoto Nakanishi, Okayama (JP); Ryoji Kanno, Tokyo (JP); Genki Kobayashi, Tokyo (JP); Mikio Takano, Kyoto (JP)

(73) Assignee: National University Corporation Okayama University, Okayama (JP)

( * ) Notice: Subject to any disclaimer, the term of this patent is extended or adjusted under 35 U.S.C. 154(b) by 46 days.

(21) Appl. No.: 14/369,507

(22) PCT Filed: Dec. 27, 2012

(86) PCT No.: PCT/JP2012/083866
§ 371 (c)(1),
(2) Date: Jun. 27, 2014

(87) PCT Pub. No.: WO2013/100050
PCT Pub. Date: Jul. 4, 2013

(65) Prior Publication Data
US 2014/0361226 A1 Dec. 11, 2014

(30) Foreign Application Priority Data
Dec. 27, 2011 (JP) ................................. 2011-285282

(51) Int. Cl.
*H01M 4/88* (2006.01)
*H01M 4/525* (2010.01)
(Continued)

(52) U.S. Cl.
CPC .......... *H01M 4/525* (2013.01); *H01M 4/131* (2013.01); *H01M 4/523* (2013.01);
(Continued)

(58) Field of Classification Search
CPC ...................................................... B82Y 30/00
(Continued)

(56) References Cited

U.S. PATENT DOCUMENTS 6,270,925 B1 * 8/2001 Takada .................. B82Y 30/00
429/218.1
2012/0315437 A1 12/2012 Takada et al.

FOREIGN PATENT DOCUMENTS

JP 11283626 A * 10/1999
JP H11-283626 A 10/1999
(Continued)

OTHER PUBLICATIONS

Malini et al., "Conversion reactions: a new pathway to realise energy lithium-ion battery-review," Ionics, 15: 301-307 (2009).
(Continued)

*Primary Examiner* — Khanh Tuan Nguyen
(74) *Attorney, Agent, or Firm* — Morgan, Lewis & Bockius LLP

(57) ABSTRACT

This invention relates to an anode active material comprising at least one iron oxide selected from the group consisting of amorphous iron oxides, ferrihydrite, and lepidocrocite. The invention also relates to a lithium ion secondary battery anode material comprising the anode active material as a constituent component, a lithium ion secondary battery anode comprising the lithium ion secondary battery anode material, and a lithium ion secondary battery comprising the lithium ion secondary battery anode.

16 Claims, 5 Drawing Sheets

(51) Int. Cl.
*H01M 4/52* (2010.01)
*H01M 4/131* (2010.01)
*H01M 4/58* (2010.01)
*H01M 4/62* (2006.01)
*H01M 10/0525* (2010.01)

(52) U.S. Cl.
CPC .......... *H01M 4/5825* (2013.01); *H01M 4/621* (2013.01); *H01M 4/623* (2013.01); *H01M 4/624* (2013.01); *H01M 4/625* (2013.01); *H01M 10/0525* (2013.01); *H01M 2220/30* (2013.01); *Y02E 60/122* (2013.01)

(58) Field of Classification Search
USPC ...................................... 429/218.1; 252/182.1
See application file for complete search history.

(56) References Cited

FOREIGN PATENT DOCUMENTS

| JP | 2000-340256 A | | 12/2000 | |
| JP | 2002-151068 | * | 5/2002 | .............. H01M 4/52 |
| JP | 2005-079029 | * | 3/2005 | .............. H01M 4/52 |
| JP | 2007-200774 | * | 8/2007 | .............. H01M 4/52 |
| JP | 2008-177061 A | | 7/2008 | |
| JP | 2011-134628 A | | 7/2011 | |
| JP | 2011-258489 A | | 12/2011 | |
| WO | 2011/074586 A1 | | 6/2011 | |

OTHER PUBLICATIONS

Ji et al., "Recent developments in nanostructured anode materials for rechargeable lithium-ion batteries," Energy and Environmental Science, 4: 2682-2699 (2011).

Poizot et al., "Nano-sized transition-metal oxides as negative-electrode materials for lithium-ion batteries," Nature, 407: 496-499 (2000).

Chen et al., "a-Fe2O3 Nanotubes in Gas Sensor and Lithium-Ion Battery Applications," Advanced Materials, 17: 582-586 (2005).

Liu et al., "Fiberlike Fe2O3 Macroporous Nanomaterials Fabricated by Calcinating Regenerate Cellulose Composite Fibers," Chem. Mater., 20: 3623-3628 (2008).

Liu et al., "Electrochemical performance of a-Fe2O3 nanorods as anode material for lithium-ion cells," Electrochimica Acta, 54: 1733-1736 (2009).

Chun et al., "Hematite nanoflakes as anode electrode materials for rechargeable lithium-ion batteries," Electrochimica Acta, 55: 3089-3092 (2010).

International Search Report issued in corresponding International Patent Application No. PCT/JP2012/083866 dated Mar. 5, 2013.

* cited by examiner

NEGATIVE ELECTRODE ACTIVE MATERIAL AND USE OF SAME

TECHNICAL FIELD

The present invention relates to an anode active material capable of providing an electrode with high output, high capacity, and excellent cycling performance. The present invention also relates to a lithium ion secondary battery anode material comprising the anode active material as a constituent component, a lithium ion secondary battery anode comprising the lithium ion secondary battery anode material, and a lithium ion secondary battery comprising the lithium ion secondary battery anode.

BACKGROUND ART

Secondary batteries with high energy density, high voltage, high charge capacity, high discharge capacity, and excellent cycling performance have recently been required for use in products with high power consumption, such as cellular phones, notebook computers, and digital cameras. Although nickel-hydrogen batteries, lead storage batteries, nickel-cadmium batteries, and the like have been used as secondary batteries, lithium ion secondary batteries are now attracting attention for use as secondary batteries with excellent charge capacity and discharge capacity.

A lithium (Li) ion battery is a secondary battery that uses Li-metal oxide (e.g., $LiCoO_2$) as a cathode (positive electrode) and a carbon material (e.g., graphite) as an anode (negative electrode) to extract power through lithium ion transfer between the cathode and the anode via an electrolyte solution. FIG. 1 shows a schematic view. To improve the properties (i.e., to attain higher energy density), improvements in the main components, i.e., the cathode, the anode, and the electrolyte solution, are important. In particular, obtaining a cathode active material with higher voltage, higher capacity, and higher output, as well as obtaining an anode active material with higher capacity and higher output, are extremely important.

Graphite exhibits a low potential and can occlude Li ions between the layers ($LiC_6 <=> 6C+Li^++e^-$), and is thus most widely used in commercially available products. However, graphite has a theoretical capacity of 372 mAh/g. Its low capacity and unsatisfactory output characteristics are considered disadvantages for applications such as for a power source for electric vehicles, which are expected to be widely used in the future. Recent reports reveal that transition metal oxides show high reversible capacity at a low potential, and various transition metal oxides have been studied. This is called a conversion reaction. The insertion of Li reduces the valence of the metal ion in metal oxide, and the oxide is eventually reduced to metal. In this manner, a large number of electrons can be used, achieving higher capacity (e.g., $Co_3O_4+8Li<=>3Co+4Li_2O$) (Non-patent Documents 1 to 3).

Many reports regarding, in particular, iron oxide-based materials (e.g., $Fe_2O_3$) have been published since 2005 (Non-patent Documents 4 to 7). To evaluate the properties of an electrode as an anode, the reversible capacity at a low potential of 3.0 to 0 V is evaluated. A known iron oxide-based powder material shows a reversible capacity of about 500 to 800 mAh/g at a low current density of about 20 to 100 mA/g (Non-patent Documents 4 to 7).

However, all of these anode materials disclosed in the non-patent documents show unsatisfactory cycling performance, and thus have insufficient properties as anode materials. None of the non-patent documents suggest an anode material comprising an amorphous iron oxide, ferrihydrite, or lepidocrocite.

Patent Documents 1 and 2 disclose using iron oxide in the air electrode (cathode) of a lithium air battery. However, these documents nowhere disclose using iron oxide as the anode material of a lithium ion battery.

It has been reported that a lithium ion secondary battery with excellent discharge capacity and charge capacity can be provided by using, as an electrode, an iron oxide produced by an iron-oxidizing bacterium (hereinafter sometimes referred to as "biogenous iron oxide") (Patent Document 3). However, in Patent Document 3, the biogenous iron oxide is used only as a cathode active material or as a cathode for a lithium ion secondary battery.

CITATION LIST

Patent Documents

Patent Document 1: JP2011-258489A
Patent Document 2: JP2011-134628A
Patent Document 3: JP2008-177061A

Non-Patent Documents

Non-patent Document 1: Malini, R., Uma, U., Sheela, T., Ganesan, M., and Renganathan, N. G. Conversion reactions: a new pathway to realise energy in lithium-ion battery-review. Ionics 15, 301-307 (2009).
Non-patent Document 2: Ji, L., Lin, Z., Alcoutlabi, M., and Zhang, X. Recent developments in nanostructured anode materials for rechargeable lithium-ion batteries. Energy Environ. Sci. 4, 2682-2699 (2011).
Non-patent Document 3: Poizot, P., Laruelle, S., Grugeon, S., Dupont, L., and Tarascon, J. M. Nano-sized transition-metal oxides as negative-electrode materials for lithium-ion batteries. Nature 407, 496-499 (2000).
Non-patent Document 4: Chen, J., Xu, L., Li, W., and Gou, X. $\alpha$-$Fe_2O_3$ nanotubes in gas sensor and lithium-ion battery applications. Adv. Mater. 17, 582-586 (2005).
Non-patent Document 5: Liu, S. et al. Fiberlike $Fe_2O_3$ macroporous nanomaterials fabricated by calcinating regenerate cellulose composite fibers. Chem. Mater. 20, 3623-3628 (2008).
Non-patent Document 6: Liu, H. et al. Electrochemical performance of $\alpha$-$Fe_2O_3$ nanorods as anode material for lithium-ion cells. Electrochim. Acta 54, 1733-1736 (2009).
Non-patent Document 7: Chun, L., Wu, X., Lou, X., and Zhang, Y. Hematite nanoflakes as anode electrode materials for rechargeable lithium-ion batteries. Electrochim. Acta 55, 3089-3092 (2010).

SUMMARY OF INVENTION

Technical Problem

Known iron oxide-based powder materials show a discharge capacity of about 500 to 800 mAh/g, which worsens as the cycle number increases. At a high current rate, known iron oxide-based powder materials show a small capacity and unsatisfactory cycling performance.

Previously reported electrodes prepared by using biogenous iron oxide have been intended only for use as a cathode.

In view of the above, an object of the invention is to provide an anode active material capable of providing an electrode with high output, high capacity, and excellent cycling performance. Another object of the invention is to provide a lithium ion secondary battery anode material comprising the anode active material as a constituent component, a lithium ion secondary battery anode comprising the lithium ion secondary battery anode material, and a lithium ion secondary battery comprising the lithium ion secondary battery anode.

Solution to Problem

The present inventors found that the above objects can be achieved by using at least one iron oxide selected from the group consisting of amorphous iron oxides, ferrihydrite, and lepidocrocite, as an anode active material. The present inventors further found that the above objects can also be achieved by using a biogenous iron oxide powder obtained from nature as an anode active material.

Based on these findings, the present inventors conducted additional extensive research to accomplish the invention. The invention provides the following anode active material, lithium ion secondary battery anode material, lithium ion secondary battery anode, and lithium ion secondary battery.

(I) Anode Active Material (I-1) An anode active material comprising at least one iron oxide selected from the group consisting of amorphous iron oxides, ferrihydrite, and lepidocrocite.

(I-2) The anode active material according to (I-1), wherein the at least one iron oxide comprises iron and oxygen as main components, and further comprises silicon and/or phosphorus.

(I-3) The anode active material according to (I-1) or (I-2), wherein the at least one iron oxide has an elemental ratio of iron to silicon or phosphorus of 60-99.9:40-0.1 by atomic percent, with the proviso that the total of iron and silicon or phosphorus by atomic percent is taken as 100.

(I-4) The anode active material according to (I-1) or (I-2), wherein the at least one iron oxide has an elemental ratio of iron to silicon to phosphorus of 66-87:2-27:1-32 by atomic percent, with the proviso that the total of iron, silicon, and phosphorus by atomic percent is taken as 100.

(I-5) The anode active material according to any one of Items (I-1) to (I-4), wherein the at least one iron oxide is produced by an iron-oxidizing bacterium.

(I-6) The anode active material according to (I-5), wherein the at least one iron oxide is separated from an aggregated precipitate formed in a water purification method using iron bacteria.

(I-7) The anode active material according to (I-5) or (I-6), wherein the iron-oxidizing bacterium belongs to *Leptothrix* sp.

(I-8) The anode active material according to (I-7), wherein the at least one iron oxide is amorphous.

(I-9) The anode active material according to (I-5) or (I-6), wherein the iron-oxidizing bacterium is *Leptothrix cholodnii* OUMS1 (NITE BP-860).

(I-10) The anode active material according to (I-9), wherein the at least one iron oxide is ferrihydrite and/or lepidocrocite.

(I-11) The anode active material according to any one of Items (I-5) to (I-10), wherein the at least one iron oxide comprises carbon in an amount of 0.1 to 5 wt %.

(II) Lithium Ion Secondary Battery Anode Material and Lithium Ion Secondary Battery Anode (II-1) A lithium ion secondary battery anode material comprising the anode active material of any one of Items (I-1) to (I-11) as a constituent component.

(II-2) The lithium ion secondary battery anode material according to (II-1), further comprising a conductive auxiliary agent (b) and a binding agent (c), in addition to the anode active material (a).

(II-3) The lithium ion secondary battery anode material according to (II-2), wherein the conductive auxiliary agent (b) comprises a carbon powder and/or carbon fiber, and the binding agent (c) comprises a fluorocarbon resin.

(II-4) The lithium ion secondary battery anode material according to (II-2) or (II-3), comprising the anode active material (a) in an amount of 40 to 90 wt %, the conductive auxiliary agent (b) in an amount of 5 to 40 wt %, and the binding agent (c) in an amount of 5 to 20 wt %.

(II-5) A lithium ion secondary battery anode comprising the lithium ion secondary battery anode material of any one of Items (II-1) to (II-4).

(III) Lithium Ion Secondary Battery (III-1) A lithium ion secondary battery having the lithium ion secondary battery anode of (II-5).

Advantageous Effects of Invention

The use of the anode active material of the invention enables providing an electrode with high output, high capacity, and excellent cycling performance. Further, the use of iron oxide produced by iron-oxidizing bacteria enables providing an electrode with the above properties by using an extremely simple method. These electrodes exhibit extremely excellent properties for use as the anode of a Li-ion battery, and are thus expected to be applied in various fields where Li-ion batteries are used.

DESCRIPTION OF EMBODIMENTS

Figure 1:
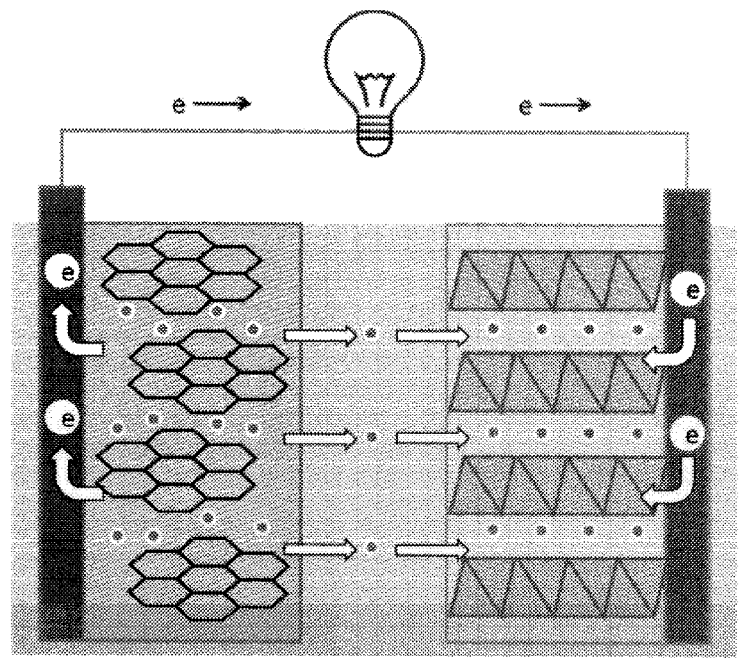
FIG. 1 is a schematic view of a Li-ion battery. The electrode on the left represents the anode (graphite) while the electrode on the right represents the cathode ($LiCoO_2$). The electrons are removed as a result of Li-ion transfer between the cathode and the anode via the electrolyte solution. Generally, the cathode comprises a material having a potential with a larger difference from that of Li, while the anode comprises a material having a potential with a smaller difference from that of Li; the difference in the potentials determines the voltage of the battery. A commercially available Li-ion battery uses $LiCoO_2$ as the cathode and graphite as the anode, and has a voltage of about 3.6 V.

The present invention is described in detail below.

The anode active material of the invention has a feature in that it comprises at least one iron oxide selected from the group consisting of amorphous iron oxides, ferrihydrite, and lepidocrocite.

Ferrihydrite refers to a low-crystalline iron oxide and is called 2-line ferrihydrite, 6-line ferrihydrite, or the like, depending on the number of peaks appearing in X-ray diffraction pattern. The composition of 2-line ferrihydrite is $Fe_4(O, OH, H_2O)$, and the composition of 6-line ferrihydrite is $Fe_{4.6}(O, OH, H_2O)_{12}$ (R. A. Eggleton and R. W. Fitzpatrick, "New data and a revised structural model for ferrihydrite," Clays and Clay Minerals, Vol. 36, No. 2, pages 111-124, 1988).

Lepidocrocite is a crystalline iron oxide represented by the chemical formula of $\gamma$-FeOOH and having the following properties: Crystal system: orthorhombic system, space group: Bb mm, lattice constant: a=0.3071, b=1.2520, c=0.3873 Å, and $\alpha=\beta=\gamma=90°$.

The iron oxide used in the invention preferably comprises iron and oxygen as main components, and further comprises silicon and/or phosphorus. More preferably, the iron oxide used in the invention comprises iron and oxygen as main components, and further comprises silicon and phosphorus.

It is desirable that the iron oxide of the invention comprising silicon or phosphorus has an element ratio of iron to silicon or phosphorus by atomic percent of 60-99.9:40-0.1, and preferably 70-95:30-5 (the total of iron and silicon or phosphorus by atomic percent being taken as 100).

It is desirable that the iron oxide of the invention comprising silicon and phosphorus has an element ratio of iron to silicon to phosphorus by atomic percent of 66-87:2-27:1-32, and preferably 70-75:5-15:5-20 (the total of iron, silicon, and phosphorus by atomic percent being taken as 100).

The iron oxide of the invention may either be an iron oxide prepared by using a synthetic method or an iron oxide produced by an iron-oxidizing bacterium. The synthetic method of an iron oxide comprising ferrihydrite and silicon and/or phosphorus is described below.

Ferrihydrite

Examples of methods for synthesizing ferrihydrite of the invention include a reaction of an iron compound in a manner described below.

An iron compound is dissolved in a solvent, and an aqueous alkaline solution (e.g., ammonia, sodium hydroxide, potassium hydroxide, or calcium carbonate) is added thereto dropwise under stirring to adjust the pH to about 10. The obtained precipitate is washed with distilled water, collected by centrifugation, and dried under reduced pressure, followed by pulverization to prepare 2-line ferrihydrite.

Specific examples of the iron compound include iron nitrate, iron sulfate, iron chloride, iron carbonate, and the like. Of these, iron nitrate is preferable.

Examples of a medium with which the iron compound is reacted include aqueous solutions, alcohols, and the like, with aqueous solutions being preferable.

The reaction is performed at a temperature of 10 to 50° C., and preferably 20 to 30° C.

Iron Oxide Comprising Silicon and/or Phosphorus

Examples of methods for synthesizing the iron oxide of the invention comprising silicon and/or phosphorus include a reaction of an iron compound, a silicon compound, and a phosphorus compound performed in the following manner.

An iron compound and a silicon compound and/or a phosphorus compound are dissolved in a solvent at a given ratio, and an aqueous alkaline solution (e.g., ammonia, sodium hydroxide, potassium hydroxide, or calcium carbonate) is added thereto dropwise under stirring to adjust the pH to about 10. The obtained precipitate is washed with distilled water, collected by centrifugation, and dried under reduced pressure, followed by pulverization to prepare an iron oxide comprising silicon and/or phosphorus.

Specific examples of the iron compound include iron nitrate, iron sulfate, iron chloride, iron carbonate, and the like. Of these, iron nitrate is preferable.

Specific examples of the silicon compound include sodium silicate, potassium silicate, and the like.

Specific examples of the phosphorus compound include phosphoric acid, sodium phosphate, potassium phosphate, and the like.

Examples of a medium with which the iron compound, etc., are reacted include aqueous solutions, alcohols, and the like, with aqueous solutions being preferable.

The reaction is performed at a temperature of 10 to 50° C., and preferably 20 to 30° C.

Iron Oxide Produced by Iron-Oxidizing Bacteria (Biogenous Iron Oxide)

An iron-oxidizing bacterium is not particularly limited as long as it forms an amorphous iron oxide, ferrihydrite, or lepidocrocite. Examples of iron-oxidizing bacteria include *Toxothrix* sp. bacteria, *Leptothrix* sp. bacteria, *Crenothrix* sp. bacteria, *Clonothrix* sp. bacteria, *Gallionella* sp. bacteria, *Siderocapsa* sp. bacteria, *Siderococcus* sp. bacteria, *Sideromonas* sp. bacteria, *Planktomyces* sp. bacteria, and the like.

*Leptothrix ochracea* belonging to *Leptothrix* sp. mentioned above is capable of producing biogenous iron oxide with a hollow fibrous sheath structure. *Gallionella ferruginea* belonging to *Gallionella* sp. is capable of producing helical biogenous iron oxide.

An iron oxide produced by an iron-oxidizing bacterium, such as a bacterium belonging to *Leptothrix* sp., is generally an amorphous iron oxide.

A *Leptothrix cholodnii* strain OUMS1 is one example of *Leptothrix* sp. bacteria. The *Leptothrix cholodnii* strain OUMS1 was deposited on Dec. 25, 2009, as Accession No. NITE P-860 in the National Institute of Technology and Evaluation, Patent Microorganisms Depositary (Kazusa Kamatari 2-5-8, Kisarazu, Chiba, 292-0818, Japan). This bacterial strain has been transferred to the international deposit under Accession No. NITE BP-860. The *Leptothrix cholodnii* strain OUMS1 produces iron oxides, such as ferrihydrite and lepidocrocite.

There is no particular limitation to the method for obtaining biogenous iron oxide, and various methods can be used. For example, a method for obtaining biogenous iron oxide from an aggregated precipitate produced in a biological water purification method (water purification method using iron bacteria) or produced by iron-oxidizing bacteria present in a water purification plant (see JP2005-272251A); the method disclosed in JPH10-338526A, which is for producing pipe-shaped particulate iron oxides; or other methods can be used as the method for obtaining biogenous iron oxide. For the explanations of these methods, the disclosures of these documents are incorporated herein by reference.

In contrast to a rapid-filtration water purification method, which removes impurities from raw water by means of only an aggregation effect of polyaluminum chloride (PAC) or another flocculant, "water purification method using iron bacteria" removes impurities by means of the cleaning action of microorganisms. Examples of methods for removing impurities by means of the cleaning action of microorganisms include a method for removing impurities by causing impurities in raw water to aggregate and precipitate by using the aggregation action of microorganisms, such as iron-oxidizing bacteria. The method is not particularly limited as long as water purification is performed by microorganisms. The method may be what is referred to as a slow-speed filtration water purification method (natural filtration method), which only involves forming a microorganism film on the surface of a sand layer and filtering raw water through the sand layer, or a medium-speed filtration water purification method, which involves washing a filter layer to prevent the filter layer from being blocked so that the filtration rate is maintained.

Among the iron-oxidizing bacteria used in the water purification method using iron bacteria, in particular, *Leptothrix* sp. bacteria are predominant bacteria on the filter layer used in the water purification method using iron bacteria, and mainly produce biogenous iron oxide with a hollow fibrous sheath structure. The inventors have confirmed that biogenous iron oxide with a hollow fibrous sheath structure produced by *Leptothrix* sp. bacteria have excellent properties in that they each have a hollow with an internal diameter of about 1.0 μm and an outer diameter of about 1.2 μm, and are almost uniform particles.

In this invention, the definition of the expression "water purification method using iron bacteria" includes the meaning of a phenomenon that involves removing iron ions, etc., from raw water by causing the iron ions, etc., in raw water to aggregate by using the action described above. The definition of "water purification method using iron bacteria" does not only include the meaning of implementation of water purification for the purpose of only purifying water on a practical scale, but also includes the meaning of implementation of water purification on a small scale, such as on the scale of a laboratory.

The biogenous iron oxide usable in the invention may preferably be biogenous iron oxide separated from an aggregated precipitate produced in the water purification method using iron bacteria. The method for separating biogenous iron oxide is not particularly limited as long as biogenous iron oxide can be separated from an aggregated precipitate. The method may be performed in an easy way by causing a suspension of the aggregated precipitate above to pass through, for example, a sieve, a mesh, a filter, or a drainboard-like net used in paper milling, with a pore size (mesh size) that allows only impurities but not biogenous iron oxide.

The aggregated precipitate is produced in the water purification method using iron bacteria in such a manner that iron ions, etc., in raw water are aggregated by means of the aggregation action of iron-oxidizing bacteria and precipitated as clusters. However, the aggregated precipitate as used herein is sufficient if the impurities in raw water are aggregated by means of the aggregation action of iron-oxidizing bacteria, and an aggregate that is not particularly sedimented (precipitated) may also be used as the aggregated precipitate. Specifically, the aggregated precipitate as used herein may be in a floating state in water, etc., or in a suspension state in which the precipitate is resuspended after washing, etc. The precipitate may also be in dry state in which moisture is evaporated from the precipitate.

The method for obtaining an aggregated precipitate is not particularly limited. A precipitate may be collected from a precipitate deposited on a filter layer used in a water purification plant. Backwash water (wash water) used in a slow-speed (or medium-speed) filtration water purification method may also be used. It is also possible to use a filtration residue separately filtered off by a filtration device, and a precipitate obtained by centrifugation. Further, decantation may be carried out to obtain an aggregated precipitate that is naturally sedimented.

In order to efficiently collect biogenous iron oxide from the aggregated precipitate, it is preferable to cause a dispersion agent to act on the aggregated precipitate. The dispersion agent is not particularly limited as long as it can prevent biogenous iron oxide with a hollow fibrous sheath structure contained in the aggregated precipitate produced in the water purification method using iron bacteria from forming clusters (bulking). The dispersion agent may be a natural product or a synthetic product. The dispersion agent may preferably be a viscous papermaking agent that is generally used in the paper industry.

Examples of the viscous papermaking agent include plant-derived viscous papermaking agents ("neri" (a starchy substance used in making Japanese paper)), such as a *Hydrangea paniculata* extract and an *Abelmoschus manihot* (*Hibiscus manihot*) extract used for Japanese paper milling, viscous papermaking agents containing microorganism-producing polysaccharides as an active ingredient (see, for example JPH08-325986A), synthetic viscous papermaking agents, such as nonionic viscous papermaking agents (see, for example, JP2003-253587A and JP2000-290892A), and the like. Of these, plant-derived viscous papermaking agents, such as a *Hydrangea paniculata* extract and an *Abelmoschus manihot* extract are particularly preferable for use as dispersion agents, from the view point of, for example, high dispersion ability and high safety in terms of environmental risks. In addition to the above, polysaccharide, polyuronide, sodium alginate, cellulose derivative, polymetaphosphate, sodium polyacrylate, polyacrylamide, polyethylene oxide, and the like may also be used as a dispersion agent in this invention.

The method for causing a dispersion agent to act on an aggregated precipitate is described below. There is no limitation to the method as long as the aggregated precipitate and the dispersion agent are brought into contact with each other in an appropriate solvent, such as water, and the dispersion effect of the dispersion agent can be exerted. In an easy way, the aggregated precipitate and the dispersion agent are suspended in water at an appropriate ratio. While the suspension is allowed to stand or is subjected to shaking for a given period of time, the dispersion agent is allowed to act on the aggregated precipitate. It is preferable that the action is caused while the suspension is subjected to shaking because the aggregated precipitate and the dispersion agent more frequently come into contact with each other and more significant dispersion effect can be attained. The temperature in which the action is caused is not particularly limited, and is preferably 0 to 25° C., and more preferably 5 to 15° C. The conditions in regards to the time in which the action is caused varies depending on, for example, the state of aggregated precipitate, the dispersion ability of the dispersion agent, the concentration of the dispersion agent, and the mixing ratio of the aggregated precipitate to the dispersion agent. Appropriate conditions may therefore be determined in view of the above. Generally, the action is caused preferably for 30 minutes or more and 7 days (168 hours) or less, and more preferably 2 hours or more and 1 day (24 hours) or less. If the time in which the action is caused is too short, a sufficient dispersion effect cannot be attained, and if the time is too long, the efficiency of the action worsens. Preferable conditions in terms of the mixing ratio of the aggregated precipitate to the dispersion agent also vary depending on, for example, the state of the aggregated precipitate, the dispersion ability of the dispersion agent, and the concentration of the dispersion agent. Appropriate conditions may therefore be determined in view of the above.

The method for collecting biogenous iron oxide from the solution in which the dispersion agent has acted on the aggregated precipitate (hereinafter, this solution is referred to as "dispersion") is described below. The collecting method is not particularly limited as long as it is a method that can separate biogenous iron oxide from impurities, such as mud and sand. For example, the dispersion may be passed through, for example, a mesh, a filter, a drainboard-like net used in paper milling, etc., with a pore size (mesh size) that allows only impurities but not biogenous iron oxide. The preferable conditions of the pore size (mesh size) of a mesh, etc., used for collecting the iron oxide vary depending on, for example, the state of biogenous iron oxide and the type of impurities. Appropriate conditions may therefore be determined in view of the above. Although a larger pore size (mesh size) can shorten the collection time, the collection rate will decrease. Conversely, although a smaller pore size (mesh size) can improve the collection rate, a longer collection time will be required. According to the study of the present inventors, the pore size (mesh size) is preferably about 1 mm×1 mm or less when biogenous iron oxide with a hollow fibrous sheath structure is collected from a dispersion containing a *Hydrangea paniculata* extract and the aggregated precipitate obtained in a medium-speed filtration water purification method.

A method for obtaining biogenous iron oxide from an aggregated precipitate produced by iron-oxidizing bacteria present in a water purification plant, etc., is described below. First, a precipitate is collected, the precipitate being formed by iron-oxidizing bacteria (e.g., *Leptothrix ochracea*, which is a *Leptothrix* sp. bacterium (hereinafter appropriately referred to as "*L. ochracea*")) present in a water purification plant that uses a natural filtration method, etc. The constituent element ratio, the structure, etc., of biogenous iron oxide obtained from the precipitate formed by *L. ochracea* vary depending on, for example, the water quality and the temperature of the environment where the iron-oxidizing bacterium survives. However, there is no limitation as long as *L. ochracea* can produce a precipitate, and biogenous iron oxide having a hollow fibrous sheath structure as its main structure can be obtained.

Subsequently, the precipitate above is washed. The liquid used for washing is not particularly limited, and distilled water is preferably used. Then, sand and other impurities are further removed from the washed sludge by using a sieve. In this manner, biogenous iron oxide can be obtained. The obtained biogenous iron oxide may be sorted by specific gravity by centrifugal separation, if necessary.

a pipe-shaped iron oxide can also be obtained by using the method for producing pipe-shaped particulate iron oxides disclosed in JPH10-338526A.

The structure of the biogenous iron oxide produced by an iron-oxidizing bacterium varies depending on the iron-oxidizing bacterium used for the production and the conditions for the production. The produced biogenous iron oxide has a hollow fibrous sheath structure, a helical shape, a grain shape, and/or a thread shape. For example, the majority of biogenous iron oxide may have a hollow fibrous sheath structure or may have a grain shape, depending on the water purification plant from which the sludge is collected.

However, any iron oxide may be used as the anode active material of the invention, regardless of whether it has a hollow fibrous sheath structure, helical shape, grain shape, or thread shape, as described above, or a combination of any two or more thereof, as long as the iron oxide is produced by an iron-oxidizing bacterium.

Regarding the constituent elements of the biogenous iron oxide, biogenous iron oxide comprises iron and oxygen as main components, and further comprises silicon, phosphorus, and the like. The biogenous iron oxide may further comprise carbon in an amount of 0.1 to 5 wt %, in particular 0.2 to 2 wt %. This composition suitably varies depending on the environment, etc., in which iron-oxidizing bacteria are present. Thus, biogenous iron oxide is different in terms of composition from synthesized iron oxides, such as 2-line ferrihydrite, which do not comprise phosphorus or silicon. Further, the measurement results of samples by SEM reveal that each constituent element is uniformly distributed in biogenous iron oxide.

Lithium Ion Secondary Battery Anode Material and Lithium Ion Secondary Battery Anode The lithium ion secondary battery anode material of the invention has a feature in that it comprises the above anode active material as a constituent component.

The lithium ion secondary battery anode material of the invention preferably comprises a conductive auxiliary agent (b) and a binding agent (c), in addition to the anode active material (a).

Examples of the conductive auxiliary agent (b) include natural graphites (e.g., flake graphite, scale-like graphite, and amorphous graphite), artificial graphite, carbon black, acetylene black, Ketjen black, carbon fiber, polyphenylene derivative, polyacethylene, and the like, with carbon powder and/or carbon fiber being preferable.

Examples of the binding agent (c) include polyacrylic acid, carboxymethyl cellulose, polytetrafluoroethylene, polyvinylidene fluoride, polyvinyl alcohol, starch, diacetyl cellulose, hydroxypropyl cellulose, polyvinyl chloride, polyvinylpyrrolidone, polyethylene, polypropylene, SBR, EPDM, sulfonated EPDM, fluororubber, polybutadiene, polyethylene oxide, and the like, with fluorocarbon resin being preferable.

The amounts of the anode active material (a), the conductive auxiliary agent (b), and the binding agent (c) contained in the lithium ion secondary battery anode material of the invention are not particularly limited, and are, for example, 40 to 90 wt %, 5 to 40 wt %, 5 to 20 wt %, respectively, and preferably 50 to 80 wt %, 10 to 30 wt %, and 5 to 10 wt %, respectively.

The lithium ion secondary battery anode of the invention has a feature in that it comprises the above lithium ion secondary battery anode material. The lithium ion secondary battery anode of the invention can be obtained by dispersing the anode active material (a), the conductive auxiliary agent (b), and the binding agent (c) in a solvent such as 1-methyl- 2-pyrrolidinone, kneading the dispersion, and applying the resulting product to a collector such as copper foil.

The collector above is not particularly limited as long as it is conductive metal. Examples include elemental substances, such as copper and stainless steel, and alloys thereof.

The shape of the lithium ion secondary battery anode is not particularly limited; it is preferably sheet-shaped. If it is sheet-shaped, the lithium ion secondary battery anode can be minimized.

Lithium Ion Secondary Battery

The lithium ion secondary battery of the invention has a feature in that it comprises the lithium ion secondary battery anode described above. One embodiment of the lithium ion secondary battery of the invention is described below.

Figure 2:
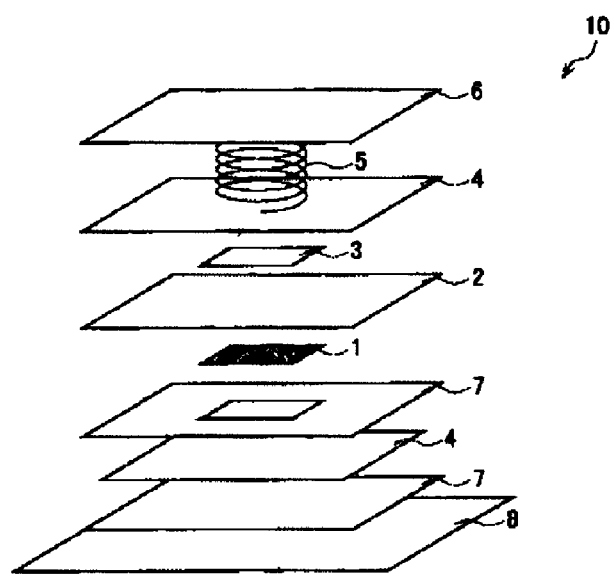
FIG. 2 is an exploded view showing one embodiment of a lithium ion secondary battery according to the present invention.

FIG. 2 is an exploded view showing a lithium ion secondary battery 10 of the invention. As shown in FIG. 2, a spacer 2, a lithium ion secondary battery anode 3 of the invention, an SUS plate 4, a spring 5, and an SUS plate anode 6 are provided from the cathode 1 to the SUS plate anode 6 side, and a Teflon spacer 7, a SUS plate 4, a Teflon spacer 7, and a cell substrate 8 are provided from the cathode 1 to the opposite side to the SUS plate anode 6.

The spacer 2 and the Teflon spacer 7 provide a space. Examples of the spacer 2 include Celgard 2500 and the like. Teflon (registered trademark) can be used as a material of the Teflon spacer 7. The thicknesses of the spacer 2 and the Teflon spacer 7 are not particularly limited and may be adjusted as desired.

Both the lithium anode 3 and the SUS plate anode 6 are used as the anodes of the lithium ion secondary battery 10. The cathode 1 may be a known material. For example, a material in which a composite oxide such as $LiCoO_2$ is coated on a substrate may be used. The SUS plate anode 6 preferably has corrosion resistance; thus, for example, SUS 304 stainless steel containing chromium and nickel is preferably used as the SUS plate anode 6.

The SUS plate 4 is not particularly limited as long as it is conductive. It is also preferable that the SUS plate 4 has corrosion resistance; thus, for example, SUS 304 stainless steel containing chromium and nickel is preferably used as the SUS plate 4.

The cell substrate 8 may be SUS. The cell substrate 8 preferably has corrosion resistance; thus, for example, SUS 304 stainless steel containing chromium and nickel is preferably used as the cell substrate 8.

The electrolyte solution for the lithium ion secondary battery 10 may be a mixed solution of polycarbonate (PC) with 1,2-dimethoxyethane (DME), a mixed solution of ethylene carbonate (EC) with diethyl carbonate (DEC), or the like.

The salt to be dissolved in the electrolyte solution may be a known lithium salt used for a lithium ion secondary battery. For example, $LiClO_4$, $LiPF_6$, and the like may be used.

EXAMPLES

The present invention is described in more detail with reference to the Examples, etc., below. However, the scope of the invention is not limited to the Examples, etc.

Purification of Biogenous Iron Oxide

Groundwater slurry containing biogenous iron oxide was collected from a culture tank for iron-oxidizing bacteria installed in Joyo City Cultural Center, a public facility in Joyo-shi, Kyoto. The predominant species in this culture tank was *Leptothrix ochracea*, an iron-oxidizing bacterium; and the obtained biogenous iron oxide was tubular, with a diameter of about 1 μm. A 28% aqueous $NH_3$ solution was added to the slurry to adjust the pH to 10.5, and the mixture was stirred for 10 minutes. After the stirring was stopped, the resulting mixture was allowed to stand for 40 minutes. Only the supernatant was filtered by decantation, and washed with a 4-fold amount of distilled water. The obtained wet cake was dispersed in ethanol, and stirred for 15 minutes. The suspension was filtrated through a filter, and dried at 100° C. The dried powder was ground in an agate mortar for 30 minutes to thereby obtain an active material (active material 1).

A *Leptothrix cholodnii* strain OUMS1 was cultured as in the method disclosed in WO 2011/074586, and the obtained biogenous iron oxide was washed with distilled water, followed by drying under reduced pressure. The dried powder was ground in an agate mortar for 30 minutes to thereby obtain an active material (active material 2).

The active material 1 is amorphous, and the active material 2 is a mixture of ferrihydrite and lepidocrocite.

Iron Oxide Free from Silicon and Phosphorus, and Iron Oxide Containing Silicon and/or Phosphorus An iron oxide free from silicon and phosphorus was synthesized by using the method described below, with reference to the report of Eggleton et al. (R. A. Eggleton and R. W. Fitzpatrick, Clays Clay Miner. 36, 111-124 (1988)). 0.025 mol/L of an aqueous $Fe(NO_3)_3 \cdot 9H_2O$ (Nacalai Tesque, 99.0%) solution was prepared. While the aqueous solution was vigorously stirred using a stirrer, an aqueous ammonia solution (Nacalai Tesque, 28 wt %) was slowly added dropwise. When the pH was 10.0, the resulting solution was allowed to stand for 15 minutes. Centrifugation was then performed at a rotation speed of 3000 rpm for about 10 minutes using a centrifuge (Hitachi model CT6EL), the supernatant was discarded, and distilled water was added and stirred. This procedure was repeated until the electric conductivity decreased to zero. The obtained precipitate was dried under reduced pressure and ground to thereby obtain iron oxide free from silicon and phosphorus (active material 3).

An iron oxide comprising silicon was synthesized by using the method described below, with reference to the report of Seehra et al. (M. S. Seehra, P. Roy, A. Raman, A. Manivannan, Solid State Commun., 130, 597-601 (2004)). 0.025 mol/L of an aqueous $Fe(NO_3)_3 \cdot 9H_2O$ (Nacalai Tesque, 99.0%) solution solution (solution (1)) and an appropriate amount of an aqueous $m-NaSiO_3 \cdot 9H_2O$ (Nacalai Tesque) solution (solution (2)) were prepared. Solution (2) was added to solution (1) to prepare 1 L of an aqueous solution. The concentration of Si was adjusted to 30% using $Si/(Si+Fe) \times 100$. The procedure after ammonia was added to the aqueous solution dropwise was the same as in the synthesis method of the iron oxide free from silicon and phosphorus (active material 4).

An iron oxide comprising phosphorus was synthesized as in the synthesis method of the iron oxide comprising silicon, except that $KH_2PO_4$ (Kanto Chemical Co., Inc.) was used in place of $m-Na_2SiO_3 \cdot 9H_2O$, and that the concentration of P was adjusted to 30% using $P/(P+Fe) \times 100$ (active material 5).

An iron oxide comprising silicon and phosphorus was synthesized as in the synthesis method of the iron oxide comprising silicon or the synthesis method of the iron oxide comprising phosphorus, except that $m-Na_2SiO_3 \cdot 9H_2O$ was used as a silicon source, $KH_2PO_4$ was used as a phosphorus source, and the concentrations of silicon and phosphorus were adjusted to 15% and 15%, respectively, using $(Si+P)/(Fe+Si+P) \times 100$ (active material 6).

The active material 3 was 2-line ferrihydrite, and active materials 4 to 6 comprising Si and/or P were amorphized; it was confirmed that they had a structure similar to that of biogenous iron oxide.

Electrode Production Method and Coin Cell Assembling Method

In order to produce electrodes, the active material 1 or the active material 2 was used as an active material, a mixture of Ketjen black (Lion Corporation) and vapor growth carbon fiber (VGCF, Showa Denko K.K.) at a weight ratio of 7:3 was used as a conductive auxiliary agent, and polyvinylidene fluoride (PVDF, Kureha Corporation) was used as a binding agent. The mixture ratio by weight of biogenous iron oxide:conductive auxiliary agent:PVDF was 64:27:9. The biogenous iron oxide and the conductive auxiliary agent were weighted in given mixture ratio, and mixed in a planetary ball mill (Fritsch, P-7) at 400 rpm for 24 hours using a zirconia ball-mill container and zirconia balls. A given amount of PVDF powder was added to the powder mixture and mixed. An appropriate amount of 1-methyl-2-pyrrolidinone (Sigma-Aldrich) was added thereto to obtain a slurry. The slurry was coated on a copper foil with a 50-μm doctor blade, and the coated electrode was punched to ø 15.95 mm. The electrodes produced using the active material 1 and the active material 2 are called the electrode 1 and the electrode 2, respectively (also referred to as "L-BIOX" and "OUMS1," respectively).

As comparative samples, an electrode was produced in the same manner as described above, using commercially available iron oxide ($\alpha$-$Fe_2O_3$, Kanto Chemical Co., Inc.). This electrode is called the electrode ref.

The active material 1 was pre-ground in the planetary ball mill described above at 200 rpm for 24 hours. Thereafter, the electrode was produced as in the method described above. This electrode is called the electrode 1'.

To produce electrodes, the active material 3, 4, 5, or 6 was used as an active material, a mixer of Ketjen black and VGCF at a weight ratio of 7:3 was used as a conductive auxiliary agent, and polyvinylidene fluoride (PVDF, Kureha Corporation) was used as a binding agent. The mixture ratio by weight of the active material 3, 4, 5, or 6:conductive auxiliary agent:PVDF was adjusted to 70:20:10. The active material 3, 4, 5, or 6 and the conductive auxiliary agent at a given ratio were placed into a polypropylene container, an appropriate amount of 1-methyl-2-pyrrolidinone (Sigma-Aldrich) was added thereto, and mixing was performed using a planetary and centrifugal mixer (Thinky, AR-100). PVDF was added to the mixed slurry and further mixed. The thus obtained slurry was coated on a copper foil with a 50 μm doctor blade, and the coated electrode was punched to ø 15.95 mm. The electrodes produced using the active materials 3 to 6 were called the electrodes 3 to 6, respectively.

Coin cells were assembled using the produced electrodes as the cathode and Li foil (Honjo Metal Co., Ltd.) as the counter electrodes. Celgard 2000 was used as the separator, and 1M $LiPF_6$ in EC:DEC=3:7 vol % (Tomiyama Pure Chemical Industries, Ltd.) was used as the electrolyte solution.

Test Example 1

Evaluation of Charge-discharge Properties of Electrodes 1, 2, and 1'

Figure 3:
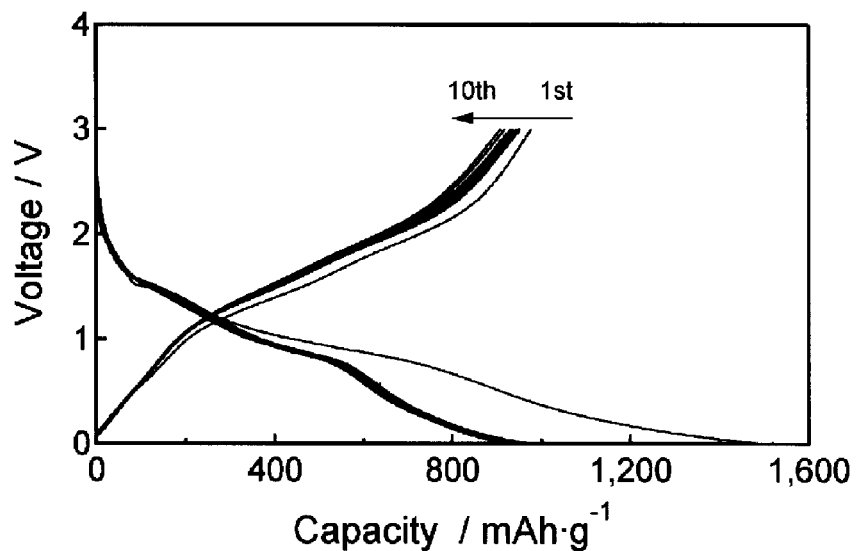
FIG. 3 is a graph showing charging and discharging curves of a biogenous iron oxide electrode (electrode 1). Voltage range: 3.0-0 V, Current density: 0.05 C (33.3 mA/g).
Figure 4:
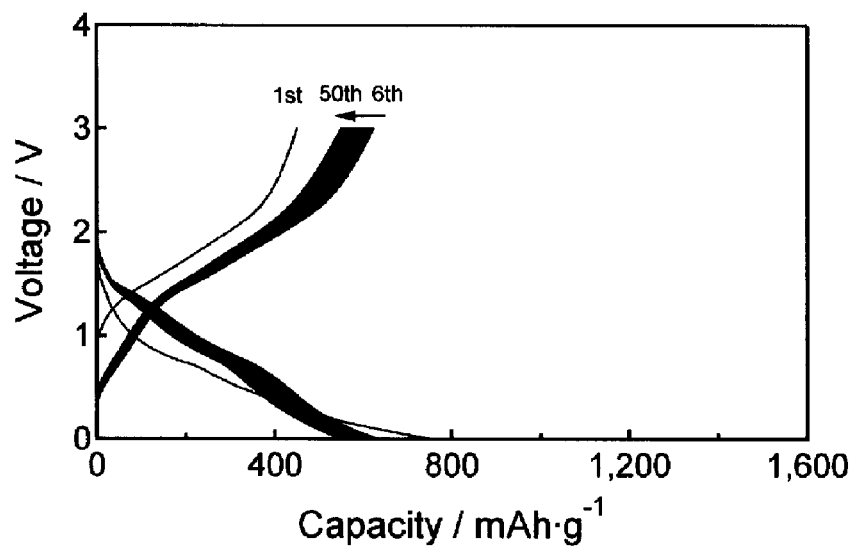
FIG. 4 is a graph showing charging and discharging curves of a biogenous iron oxide electrode (electrode 1). Voltage range: 3.0-0 V, Current density: 1 C (666 mA/g).

To evaluate the anode properties of the electrodes 1 and 2, the produced coin cells were subjected to charge-discharge measurements under the following conditions: voltage range of 3.0-0 V, current density of 33.3 mA/g (C/20) or 666 mA/g (1 C), constant current, and temperature of 25° C. A TOSCAT-3100 produced by Toyo System Co., Ltd., a HJ-1001 SD8 produced by Hokuto Denko Corporation, and a BTS2004 produced by Nagano & Co., Ltd., were used as charge and discharge units. FIGS. 3 and 4 are graphs showing charging and discharging curves of the electrode 1.

Figure 6:
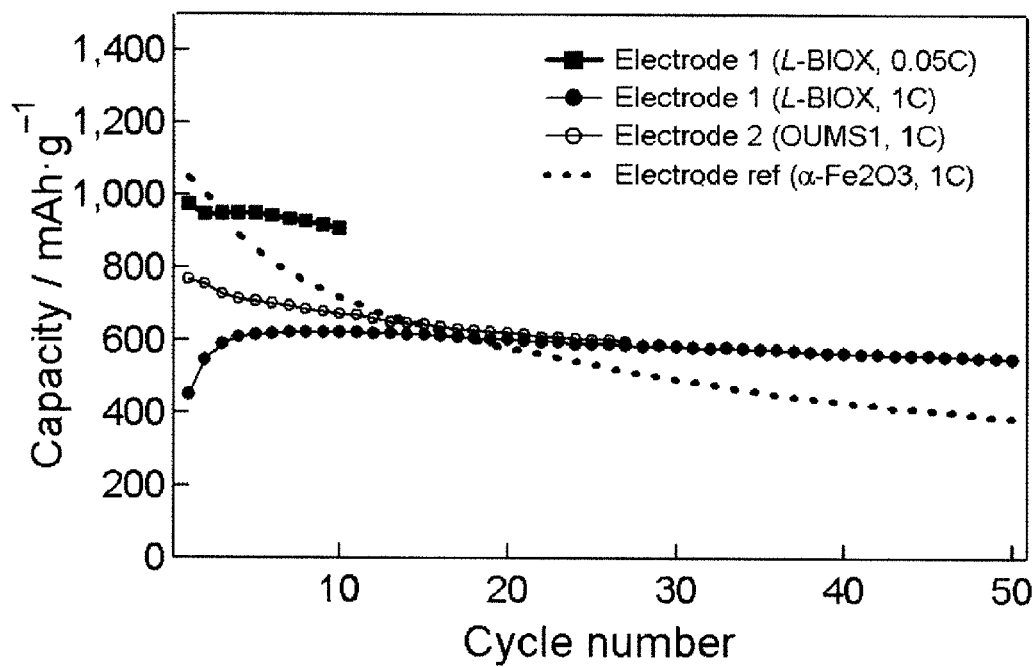
FIG. 6 is a graph showing the cycling performance (charge capacities according to change in cycle number) of electrodes 1, 2, and ref. Current densities: 0.05 C and 1 C.

In the measurements at C/20, the initial discharge capacity was a very high value of 1430 mAh/g. From the 2nd cycle onward, the reversible discharge capacity of 930 mAh/g was obtained (FIG. 3). In the measurements at a high current density of 1 C, the initial discharge capacity was 730 mAh/g, and from the next cycle onward, the reversible discharge capacity was about 600 mAh/g (FIG. 4). In terms of the charge capacity as well, high reversible capacities were obtained (900 mAh/g at 0.05 C and 550 mAh/g at 1 C) (FIG. 6). These results represent the highest value in terms of previously reported electrode characteristics of iron oxide powder. Considering that the biogenous iron oxide electrode had a reversible capacity significantly higher than the theoretical capacity (372 mAh/g) of graphite, which is a practical material, it is possible to use the biogenous iron oxide electrode as the anode of a Li-ion battery.

Figure 5:
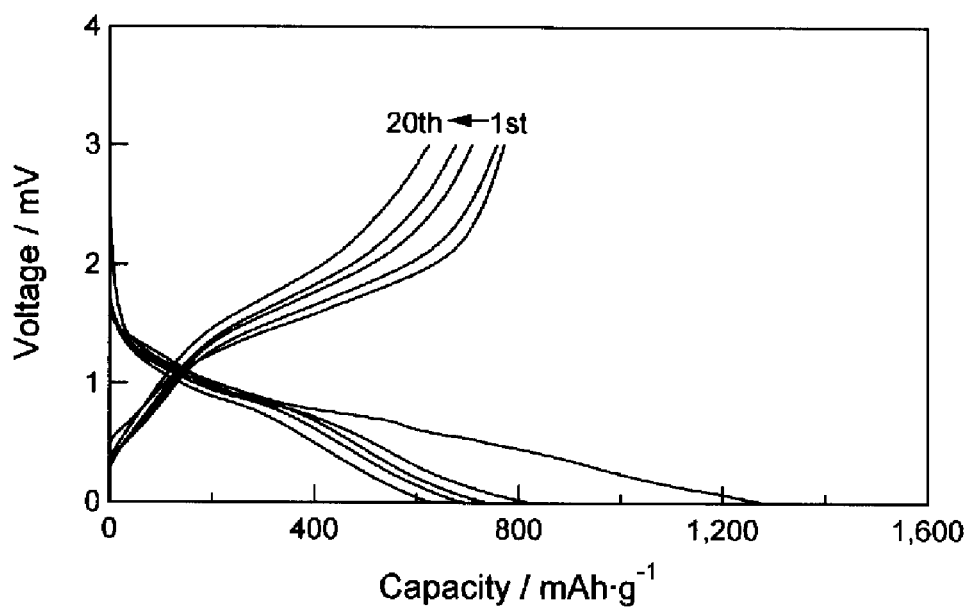
FIG. 5 is a graph showing charging and discharging curves of an OUMS1-derived biogenous iron oxide electrode (electrode 2). Voltage range: 3.0-0 V, Current density: 1 C (666 mA/g).

In the measurements at a high current density of 1 C, the electrode 2 had a charge capacity of 600 mAh/g at the 20th cycle (FIGS. 5 and 6).

As a comparative sample, the electrode characteristics of commercially available $\alpha$-$Fe_2O_3$ were measured (FIG. 6, the electrode ref). Although the initial capacity of the electrode ref was high, the cycling performance was insufficient. The capacity worsened as the cycle number increased, and at the 50th cycle, it decreased to 360 mAh/g, i.e., to about one-third of its initial capacity. As such, the problems of iron oxide generally lie in the fact that the cycling performance is insufficient, and high reversible capacity cannot be obtained. For use as the electrode of a secondary battery, insufficient cycling performance is a critical disadvantage.

In view of the above comparative experiments, the microorganism-derived iron oxide of the invention generally showed excellent cycling performance, and the electrode 1, which showed the most excellent cycling performance, had a reversible capacity as high as 550 mAh/g.

Figure 7:
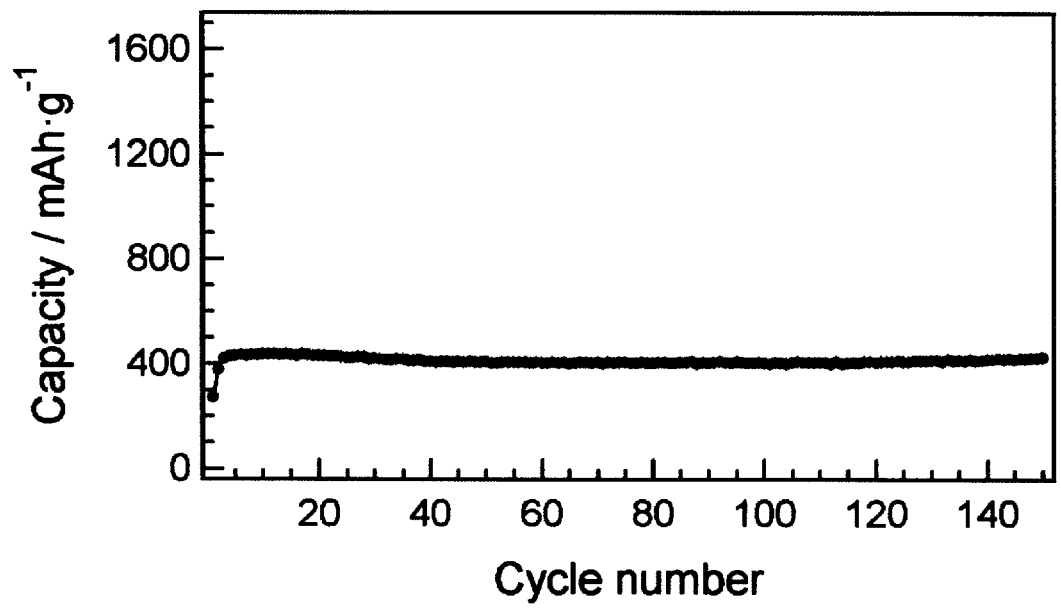
FIG. 7 is a graph showing the cycling performance (charge capacity according to change in cycle number) of a biogenous iron oxide electrode (electrode 1'). Current density: 666 mA/g.

To evaluate the long-term cycling performance (100 or more cycles) of the active material 1, the electrode 1' was subjected to charge-discharge measurements under the following conditions: voltage range of 3.0-0 V, current density of 666 mA/g (1 C), constant current, and temperature of 25° C. The reversible discharge capacity decreased (430 mAh/g); however, in terms of the cycling performance at the 150th cycle, the capacity remained at almost 100% (FIG. 7).

Test Example 2

Evaluation of Charge-Discharge Properties of Electrodes 3 to 6

To evaluate the anode properties of the electrodes 3 to 6, the produced coin cells were subjected to charge-discharge measurements under the following conditions: voltage range of 3.0-0 V, current densities of 300 mA/g (FIG. 8) and 600 mA/g (FIG. 9), constant current, 50 cycles, and temperature of 25° C.

Figure 8:
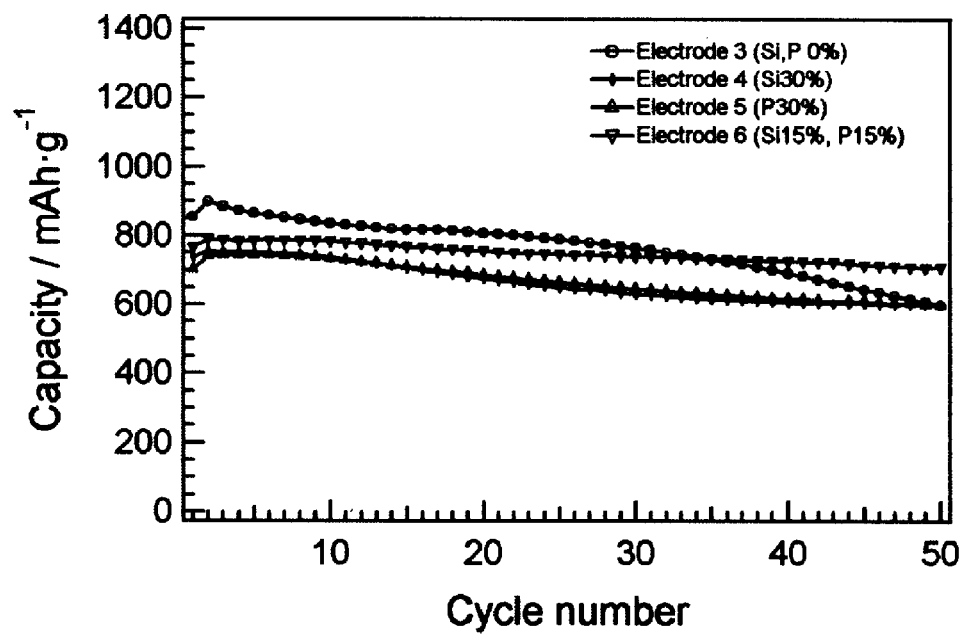
FIG. 8 is a graph showing the cycling performance (charge capacities according to change in cycle number) of electrodes 3 to 6. Current density: 300 mA/g.

FIG. 8 shows the measurement results at a current density of 300 mA/g. Although the electrode 3 free from silicon and phosphorus had a charge capacity as high as about 890 mA/g at the initial cycle, the cycling performance was unsatisfactory, and the capacity decreased to about 600 mAh/g at the 50th cycle; the capacity maintenance rate at the 50th cycle was 67%. In contrast, although the electrodes 4 to 6 each showed a slightly lower initial capacity (electrode 4: about 755 mAh/g; electrode 5: about 740 mAh/g; and electrode 6: about 790 mAh/g), the cycling performance was excellent, and the capacity maintenance rates at the 50th cycle were 79.5, 80.3, and 89.6%, respectively. The results indicate that the incorporation of silicon and phosphorus into the structure of iron oxide improves the cycling performance.

Figure 9:
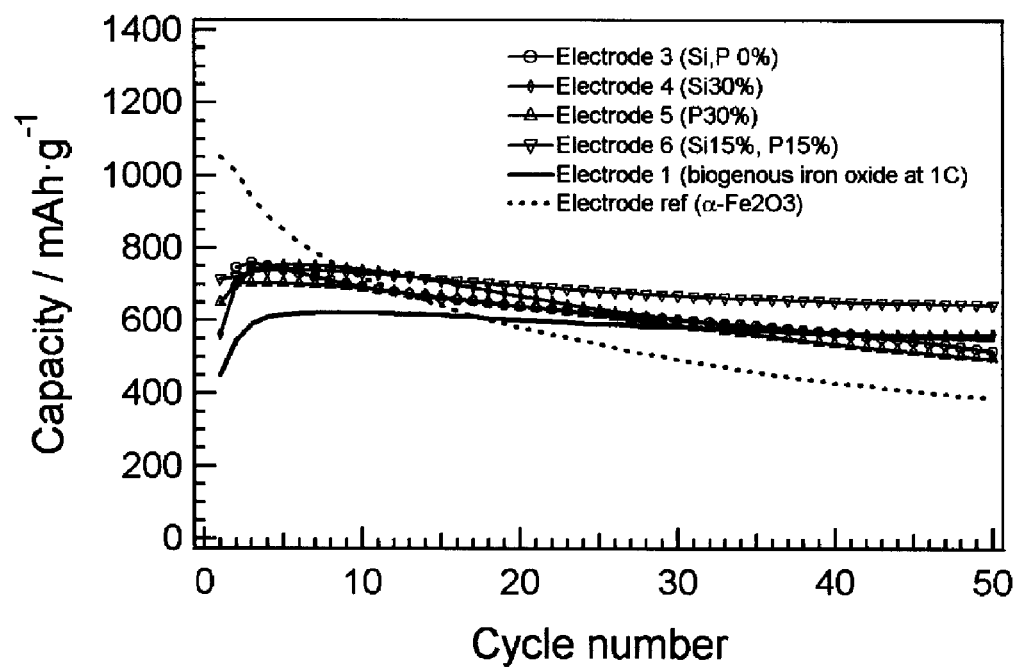
FIG. 9 is a graph showing the cycling performance (charge capacities according to change in cycle number) of electrodes 1, 3 to 6, and ref. Current density: 600 mA/g (electrodes 3 to 6) and 666 mA/g (electrode 1 and ref).

The same tendency was seen in the results shown in FIG. 9 obtained by measurement at a current density of 300 mA/g. Specifically, although the electrode 3 free from silicon and phosphorus showed a charge capacity as high as about 760 mAh/g at the initial cycle, the cycling performance was unsatisfactory, and the capacity decreased to about 520 mAh/g at the 50th cycle; the capacity maintenance rate at 50th cycle was 68.2%. In contrast, although the electrodes 4 to 6 each showed a slightly lower initial capacity (electrode 4: about 755 mAh/g; electrode 5: about 700 mAh/g; and electrode 6: about 740 mAh/g), the cycling performance was excellent, and the capacity maintenance rates at the 50th cycle were 74.7, 70.6, and 87.0%, respectively.

In both currents, the electrode 6 (Si: 15%; P: 15%) showed the most excellent cycling performance and the highest capacity at the 50th cycle. The capacities of the electrode 4 (Si: 30%) and the electrode 5 (P: 30%) at the 50th cycle were similar to that of the electrode 3 (free from Si and P); however, the electrodes 4 and 5 showed excellent cycling performance.

When the current was increased to 600 mA/g, i.e., twice the value of 300 mA/g, for example, the local maximum value of charge capacity of the electrode 3 (free from Si and P) greatly decreased to about 140 mAh/g; however, the decrease in the local maximum values of charge capacities of the electrodes 4 to 6, each comprising Si and/or P were less than or comparable to about 50 mAh/g. Even with a large amount of current, the capacity did not easily decrease, and the rate characteristic was satisfactory.

For comparison, FIG. 9 shows the charge-discharge properties of commercially available $\alpha$-$Fe_2O_3$ shown in FIG. 6. All of the electrodes 3 to 6 showed excellent cycling performance and reversible capacity, compared to commercially available iron oxide.

The invention claimed is:

1. A lithium ion secondary battery negative electrode material comprising:
   (1) a negative electrode active material comprising at least one iron oxide selected from the group consisting of amorphous iron oxides and ferrihydrite, the at least one iron oxide comprising iron and oxygen, and further comprising silicon and/or phosphorus,
   wherein (i) the at least one iron oxide comprising iron and silicon or phosphorous has an elemental ratio of iron to silicon or phosphorus of 60-99.9:40-0.1 by atomic percent, with the proviso that the total of iron and silicon or phosphorus by atomic percent is taken as 100, or (ii) the at least one iron oxide comprising iron, silicon and phosphorus has an elemental ratio of iron to silicon to phosphorus of 66-87:2-27:1-32 by atomic percent, with the proviso that the total of iron, silicon, and phosphorus by atomic percent is taken as 100; and
   (2) at least one of a conductive auxiliary agent and a binding agent.

2. The lithium ion secondary battery negative electrode material according to claim 1, wherein the lithium ion secondary battery negative electrode material comprises the conductive auxiliary agent and the binding agent, in addition to the negative electrode active material.

3. The lithium ion secondary battery negative electrode material according to claim 2, wherein the conductive auxiliary agent comprises a carbon powder and/or carbon fiber, and the binding agent comprises a fluorocarbon resin.

4. The lithium ion secondary battery negative electrode material according to claim 2 or 3, comprising the negative electrode active material in an amount of 40 to 90 wt %, the conductive auxiliary agent in an amount of 5 to 40 wt %, and the binding agent in an amount of 5 to 20 wt %.

5. The lithium ion secondary battery negative electrode material according to claim 1, wherein the at least one iron oxide comprises carbon in an amount of 0.1 to 5 wt %.

6. The lithium ion secondary battery negative electrode material according to claim 1, wherein the at least one iron oxide has an elemental ratio of iron to silicon or phosphorus of 70-95:30-5 by atomic percent, with the proviso that the total of iron and silicon or phosphorus by atomic percent is taken as 100.

7. A lithium ion secondary battery negative electrode comprising the lithium ion secondary battery negative electrode material of claim 1.

8. The lithium ion secondary battery negative electrode material according to claim 1, wherein the at least one iron oxide has a hollow fibrous sheath structure, a helical shape, a grain shape, and/or a thread shape.

9. The lithium ion secondary battery negative electrode material according to claim 1, wherein the lithium ion secondary battery negative electrode material has a specific capacity from 600 to 900 mAh/g.

10. The lithium ion secondary battery negative electrode material according to claim 1, wherein the at least one iron oxide does not comprise lithium metal oxide.

11. A lithium ion secondary battery negative electrode comprising a negative electrode active material comprising at least one iron oxide selected from the group consisting of amorphous iron oxides and ferrihydrite, the at least one iron oxide comprising iron and oxygen, and further comprising silicon and/or phosphorus,
   wherein (i) the at least one iron oxide comprising iron and silicon or phosphorous has an elemental ratio of iron to silicon or phosphorus of 60-99.9:40-0.1 by atomic percent, with the proviso that the total of iron and silicon or phosphorus by atomic percent is taken as 100, or (ii) the at least one iron oxide comprising iron, silicon and phosphorus has an elemental ratio of iron to silicon to phosphorus of 66-87:2-27:1-32 by atomic percent, with the proviso that the total of iron, silicon, and phosphorus by atomic percent is taken as 100.

12. A lithium ion secondary battery comprising the lithium ion secondary battery negative electrode of claim 11.

13. The lithium ion secondary battery according to claim 12, further comprising a positive electrode.

14. The lithium ion secondary battery negative electrode according to claim 11, wherein the at least one iron oxide comprises carbon in an amount of 0.1 to 5 wt %.

15. The lithium ion secondary battery negative electrode according to claim 11, wherein the at least one iron oxide has an elemental ratio of iron to silicon or phosphorus of 70-95:30-5 by atomic percent, with the proviso that the total of iron and silicon or phosphorus by atomic percent is taken as 100.

16. The lithium ion secondary battery negative electrode according to claim 11, wherein the at least one iron oxide has a hollow fibrous sheath structure, a helical shape, a grain shape, and/or a thread shape.

* * * * *